April 14, 1964  J. ROHLAND  3,128,814
RESILIENT WHEEL
Filed Dec. 17, 1962
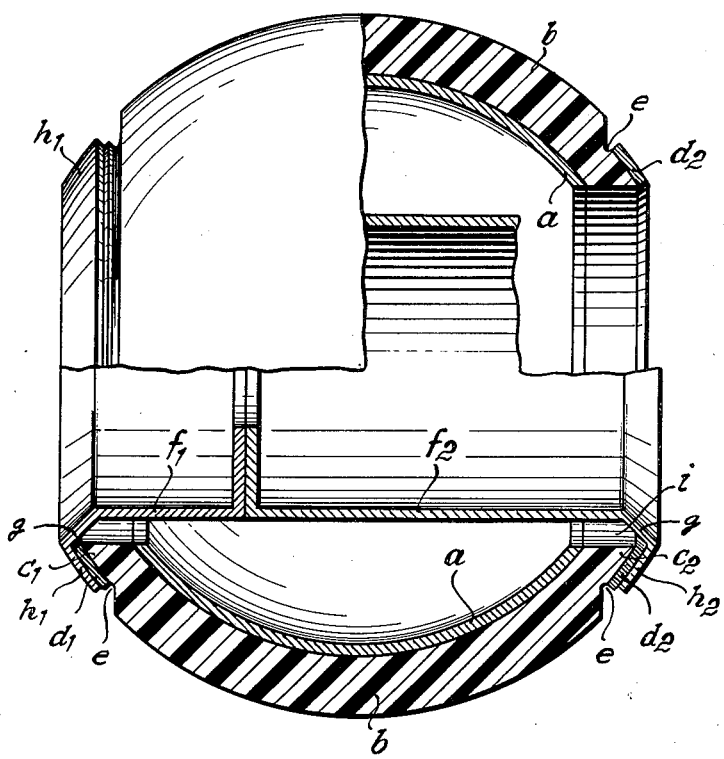
INVENTOR
JOHANNES ROHLAND

United States Patent Office 3,128,814
Patented Apr. 14, 1964

3,128,814
RESILIENT WHEEL
Johannes Rohland, Bamberg, Upper Franconia, Germany, assignor to Anny Och, née Eger, Bamberg, Germany
Filed Dec. 17, 1962, Ser. No. 245,171
2 Claims. (Cl. 152—41)

The invention relates to a wheel for vehicles and undercarriages with a tyre casing which is connected with a rigid hollow body and the two sides of which are embraced by rings rigidly connected with the hub.

Spherical wheels which are filled with air are already known. It is likewise known to accommodate passengers in the interior of a ball and to provide these one-wheel vehicles with a resilient elastic tread or rolling surface. Then again it is known to arrange between the hub body and the rim or the rolling surface of the wheel, rubber elements which allow a slight resilient displacement of the hub body in relation to the rim.

Finally it is also known to grip a rubber ring on its inner edge as in a vice so that the tyre casing serves as hollow partial spherical carrier body.

These known wheels are open to the objection that they have only a slight play of spring or resiliency, whereby the tread or rolling surface is mostly subjected to pressure.

In order to overcome this objection, the surface of the known partially spherical tyre casing extends into or is continued in the partially spherical rings and between the likewise known partly spherical hollow body and the hub a free space is provided which allows a proper range of spring or resilient play between the wheel parts. As compared with the known wheels of similar shape, the noninflated spherical wheel according to the invention possesses the advantage of greater lateral stability and has in addition to the resiliency of the elastic rolling layer or tread an additional resiliency, whereby the rolling layer present in any case is subjected to shearing stress in known manner.

Therefore, if the wheel according to the invention is mounted on vehicles, any additional spring suspension of the axle against the chassis of the vehicle and cushioning by means of air-filled tyres can be dispensed with, because the hub has sufficient amount of spring or resiliency play in relation to the rolling surface under most circumstances.

An embodiment of the invention is illustrated by way of example partly in section and partly in elevation in the only figure of the accompanying drawing.

The wheel consists of a rigid hollow spherical body $a$, on the outer side of which an elastic covering layer $b$ is arranged, being for example vulcanized thereon. This covering layer serves as tread or rolling surface. On the outer side of each of the edges $c_1$ and $c_2$ of the covering layer domed rings $d_1$ and $d_2$ respectively are fitted. The elastic covering layer $b$ may be provided with grooves $e$ in the proximity of the rings $d_1$ and $d_2$. In the interior of the spherical body $a$ there is a hub, preferably composed of two parts $f_1$ and $f_2$, which has on each of its two ends a circular connecting flange $g$ bent out at an angle. Circular domed rings $h_1$ and $h_2$ extend one from each of the flanges $g$ and are connected to one of the rings $d_1$ and $d_2$. The space $i$ formed by the connecting flanges $g$ between the hub parts $f_1$ and $f_2$ and the hollow spherical body $a$ provides space for spring or resilient play between the hub and the rigid body of the wheel.

I claim:
1. A wheel for vehicles comprising a rigid annular body formed as an annular section of a hollow, spherical body, a tread carried on the outer surface of said annular body and formed of a solid layer of elastic material bonded directly to the outer spherical surface of said rigid body, said tread layer having annular edge portions extending beyond the edges of said annular body at opposite sides thereof, a wheel hub mounted within said annular body and extending beyond the annular edge portions of said tread layer, annular rings encircling the annular edge portions of said tread layer on the outer faces thereof and being rigidly connected with the ends of said hub, said annular rings having outer surfaces conforming with annular sections of a sphere surrounding said body and said tread layer between said annular rings having an outer surface forming a continuation of the spherical outer surfaces of said annular rings, said hub being of smaller diameter than the end openings in said annular body to provide space for spring or resilient movement between said hub and said rigid body.

2. A wheel according to claim 1, and including additional annular rings surrounding the annular edge portions of said tread layer and being secured to said edge portions, said additional rings being nested within said first mentioned annular rings.

References Cited in the file of this patent
UNITED STATES PATENTS

| 1,106,302 | Heina | Aug. 4, 1914 |
| 2,709,982 | Straussler | June 7, 1955 |
| 2,920,673 | Boldt et al. | Jan. 12, 1960 |
| 3,016,967 | Rehfeld | Jan. 12, 1962 |

FOREIGN PATENTS

| 534,136 | Great Britain | Feb. 27, 1941 |
| 580,395 | Great Britain | Sept. 5, 1946 |